US011892132B2

(12) United States Patent
Zhang et al.

(10) Patent No.: US 11,892,132 B2
(45) Date of Patent: Feb. 6, 2024

(54) INTERCONNECTED STRIP LAMP

(71) Applicants: Self Electronics Co., Ltd., Zhejiang (CN); Wanjiong Lin, Zhejiang (CN); Self Electronics USA Corporation, Norcross, GA (US)

(72) Inventors: Chengke Zhang, Zhejiang (CN); Zai Le, Zhejiang (CN)

(73) Assignee: Sell Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/317,439

(22) Filed: May 15, 2023

(65) Prior Publication Data

US 2023/0375145 A1 Nov. 23, 2023

(30) Foreign Application Priority Data

May 18, 2022 (CN) ......................... 202210543140.8

(51) Int. Cl.

| | |
|---|---|
| ***F21S 4/24*** | (2016.01) |
| ***F21V 23/06*** | (2006.01) |
| ***F21Y 103/10*** | (2016.01) |
| ***F21Y 115/10*** | (2016.01) |

(52) U.S. Cl.

CPC ................ *F21S 4/24* (2016.01); *F21V 23/06* (2013.01); *F21Y 2103/10* (2016.08); *F21Y 2115/10* (2016.08)

(58) Field of Classification Search

CPC .................................. F21S 4/24; F21V 23/06

See application file for complete search history.

(56) References Cited

U.S. PATENT DOCUMENTS

| | | | | |
|---|---|---|---|---|
| 2003/0045147 | A1* | 3/2003 | Huang | H01R 13/44 439/226 |
| 2006/0262533 | A1* | 11/2006 | Lin | F21V 23/005 362/294 |
| 2009/0073692 | A1* | 3/2009 | Berger | F21S 2/005 362/249.02 |
| 2009/0147504 | A1* | 6/2009 | Teeters | F21V 33/006 362/153 |
| 2010/0008090 | A1* | 1/2010 | Li | F21V 23/06 362/249.02 |
| 2014/0085896 | A1* | 3/2014 | Li | F21S 4/24 362/249.06 |
| 2014/0293604 | A1* | 10/2014 | Diekmann | F21V 21/002 362/249.01 |
| 2016/0255699 | A1* | 9/2016 | Ye | F21K 9/27 315/127 |
| 2019/0032906 | A1* | 1/2019 | Webb | F21S 43/14 |
| 2023/0258305 | A1* | 8/2023 | Wang | F21V 19/0015 345/82 |

* cited by examiner

*Primary Examiner* — Bryon T Gyllstrom

(74) *Attorney, Agent, or Firm* — Wang Law Firm, Inc.

(57) ABSTRACT

An interconnected strip lamp has a strip lamp holder, a strip circuit board set on the strip lamp holder, a light source chip set on the strip circuit board, an optical element set above the light source chip, a male plug and a female plug set at both ends of the strip lamp holder. The strip circuit board is made of a flexible board and is provided with a conductive layer extending along the length direction on the back side. The interconnected strip lamp enables the users to cut the strip circuit board and the strip light holder as required. It can be interconnected and conducted normally after any cutting, which makes the installation of the interconnected lamp more convenient, and also reduces installation cost.

9 Claims, 11 Drawing Sheets

INTERCONNECTED STRIP LAMP

RELATED APPLICATION

This application claims priority to a Chinese Patent Application No. CN 202210543140.8, filed on May 18, 2022.

FIELD OF THE TECHNOLOGY

The invention relates to a lighting device, in particular an interconnected strip lamp.

BACKGROUND

In the context of energy saving and environmental protection, LED lamps are increasingly used in home and commercial lighting fields because of their high light-emitting efficiency and good light-gathering performance. As with the continuous improvement of people's quality of life, the demand for home and commercial lighting is also increasing.

When adjusting the range of the illumination space, adjustment of the irradiation range of the corresponding lamp is also needed. In particular in commercial lighting situation such as showcases, the range of illumination required is determined by the number of specific showcases. Therefore, by plugging and interconnecting LED strip lamps with given length, the illumination range can be adjusted conveniently and quickly.

In the prior art, the length of the hard strip lamp cannot be adjusted, which lead to that, multiple lengths of strip light or customized sections of strip light are required to lay out areas of different lengths to meet the demand. Thus manufacturing cost is greatly increased, moreover it is not convenient to install.

BRIEF SUMMARY THE TECHNOLOGY

In view of this, the present invention provides an interconnected strip lamp to solve the above technical problems.

A An interconnected strip lamp, comprising a strip lamp holder, a strip circuit board set on the strip lamp holder, a light source chip set on the strip circuit board, an optical element set above the light source chip, and, a male plug and a female plug set at both ends of the strip lamp holder, wherein the strip circuit board is made of a flexible board and is provided with a conductive layer extending along the length direction on the back side.

Preferably, the male plug comprises:

- a plug base connected to the strip lamp holder;
- a conductive elastic member, fixed on the plug base, electrically connected at one end to the strip circuit board.

Preferably, exposed surface of the conductive elastic member is set on the same side as the light source chip.

Preferably, the plug base and the strip lamp holder are integrally formed.

Preferably, the female plug comprises:

- a connecting base, connected to the strip lamp holder, the strip circuit board is extended and mounted to the connecting base;
- a connecting notch, provided at the bottom of the connecting base, the back side of the strip circuit board is oriented with the opening of the connecting notch.

Preferably, the front side of the connecting base is provided with a necking corresponding to the connecting notch to block the side edges of the strip circuit board.

Preferably, the connecting base and the strip lamp holder are integrally formed.

Preferably, connecting base is provided with a convex part for restricting end of the strip circuit board.

Preferably, the strip lamp holder is linear, L-shaped, Y-shaped, cross-shaped or V-shaped.

Preferably, the optical element is a strip lamp cover.

The technical effects of the present invention:

The interconnected strip lamp of the present invention enables the users to cut the strip circuit board and the strip light holder as required. And because the strip circuit board is made of flexible board and the back side is provided with a conductive layer extending along the length direction, so it can be interconnected and conducted normally after any cutting, which makes the installation of the interconnected lamp more convenient, and also reduces the installation cost.

BRIEF DESCRIPTION OF THE DRAWINGS

Embodiments of the present invention will be described below with reference to the drawings, in which.

DETAILED DESCRIPTION OF THE INVENTION

Figure 1:
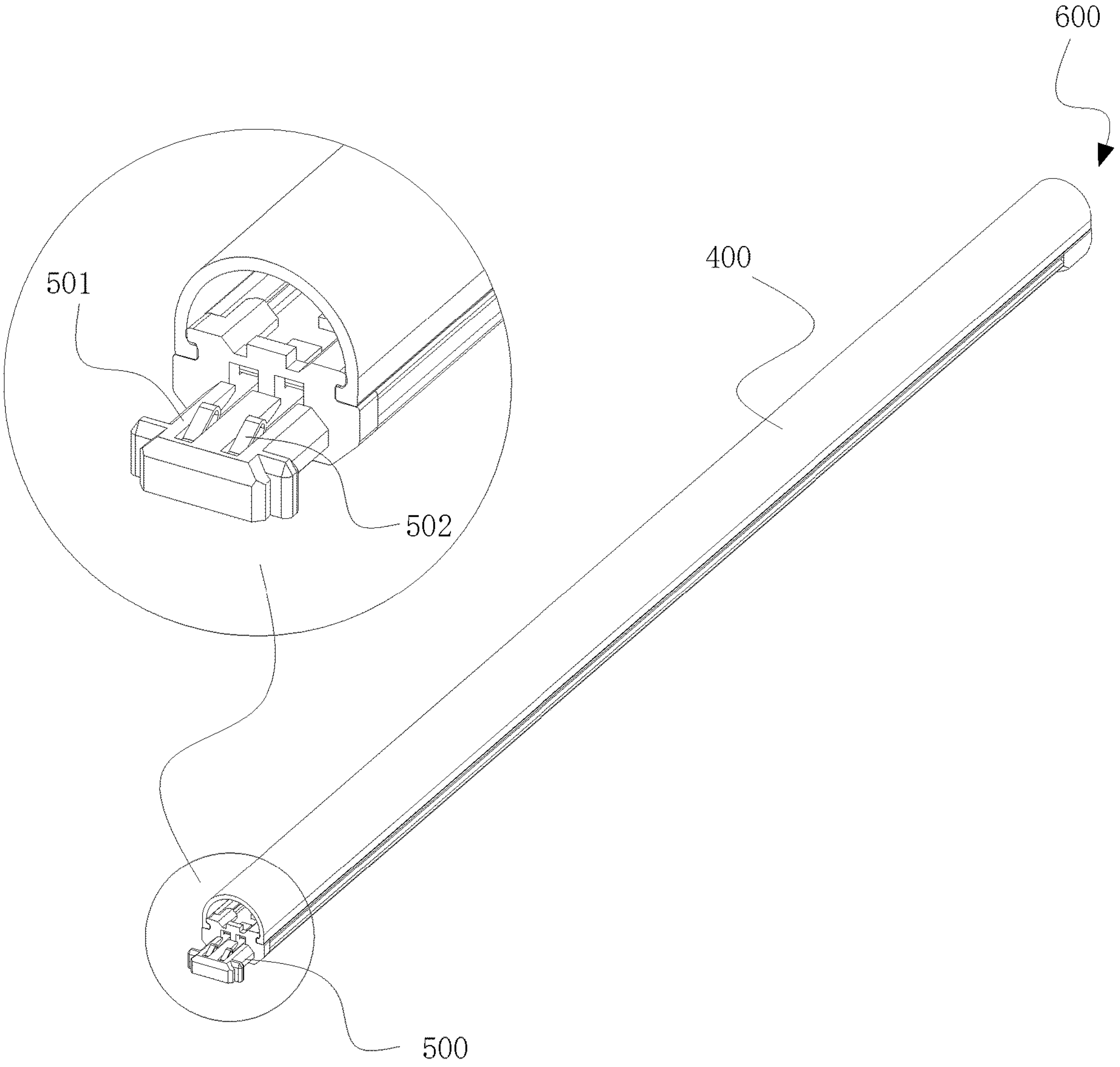
FIG. 1 is a structure schematic diagram of the interconnected strip lamp of Embodiment 1.
Figure 2:
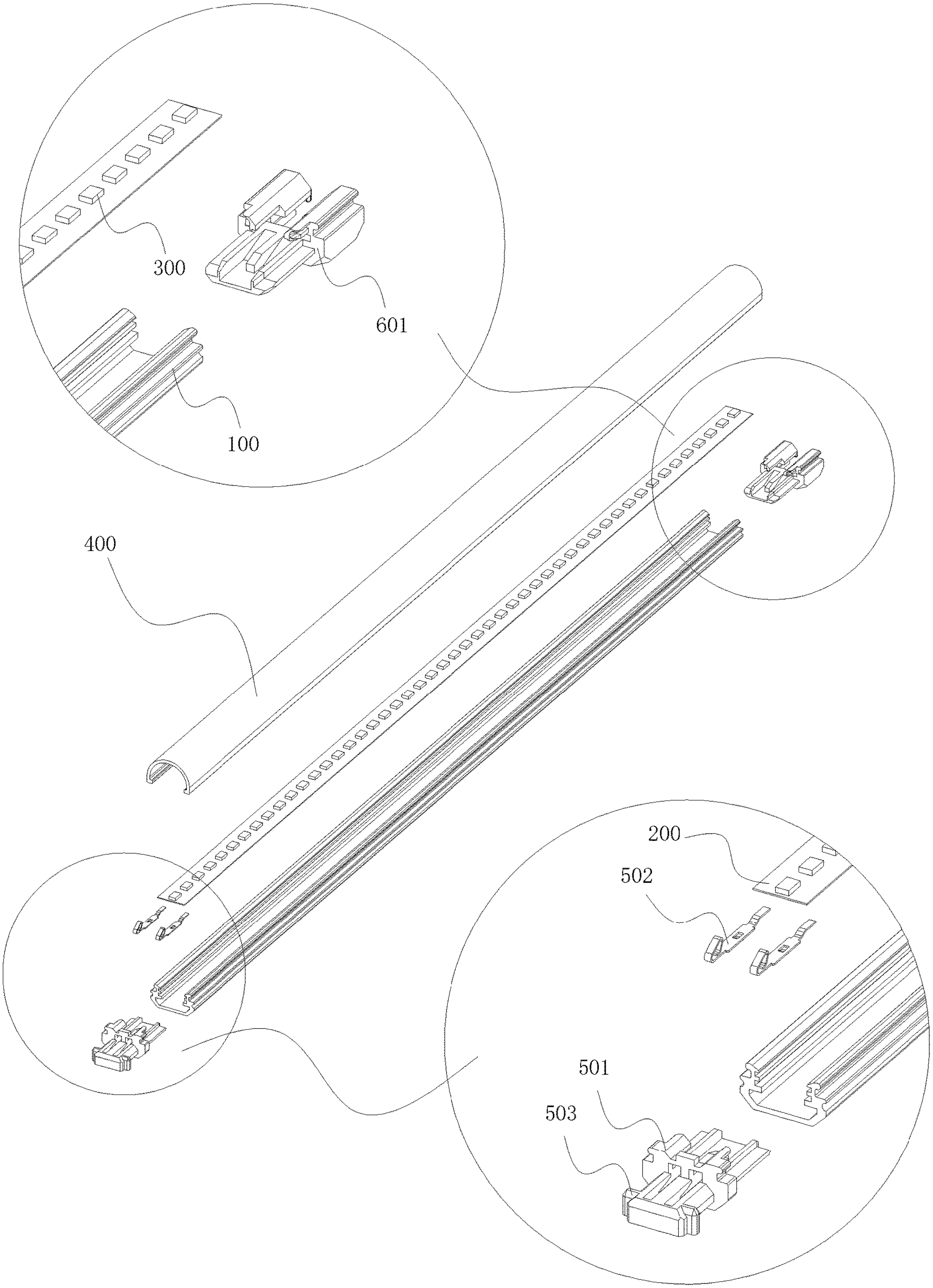
FIG. 2 is an exploded view of the interconnected strip lamp of Embodiment 1.
Figure 3:
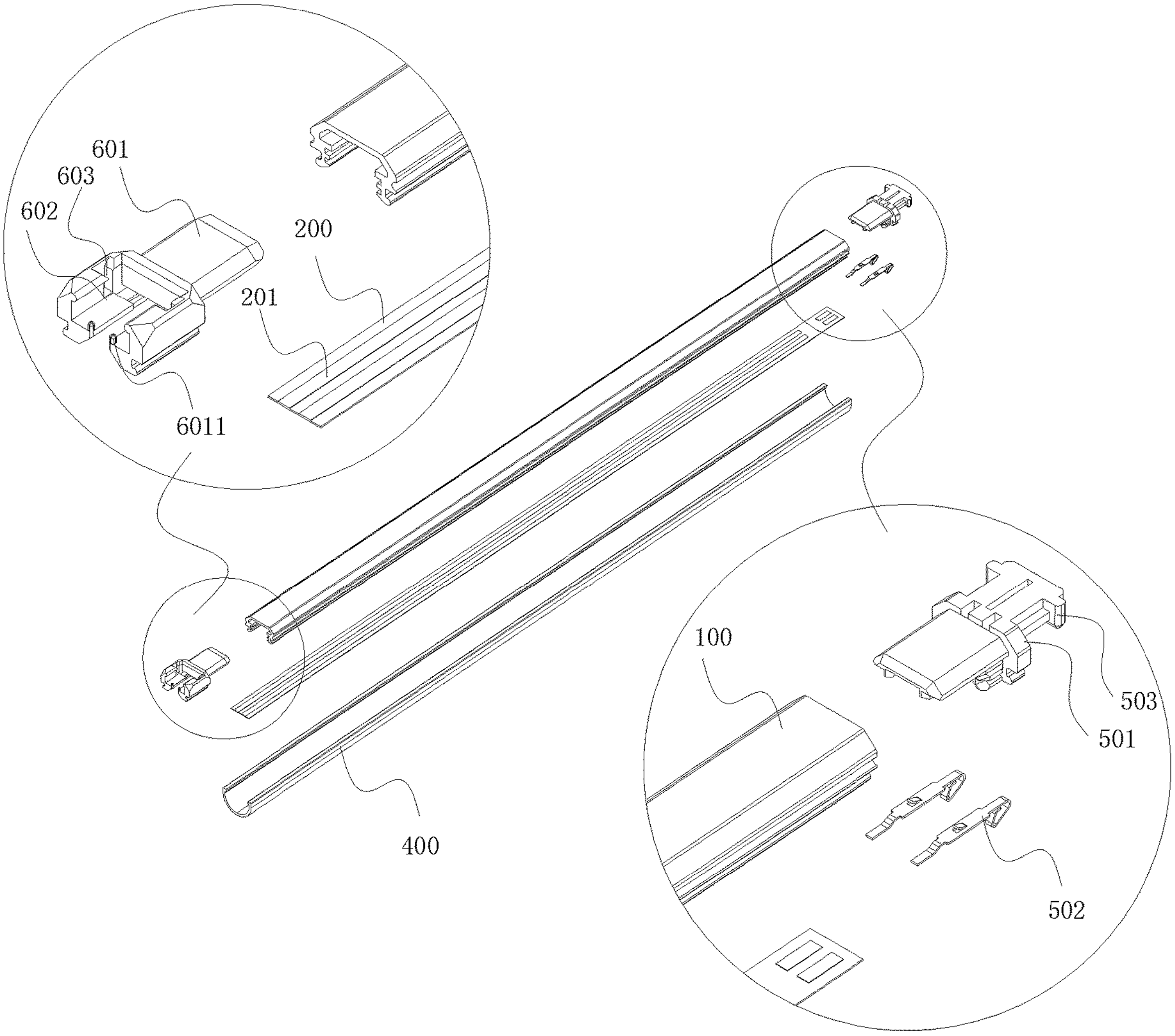
FIG. 3 is an exploded view of the interconnected strip lamp of Embodiment 1 at another angle.
Figure 4:
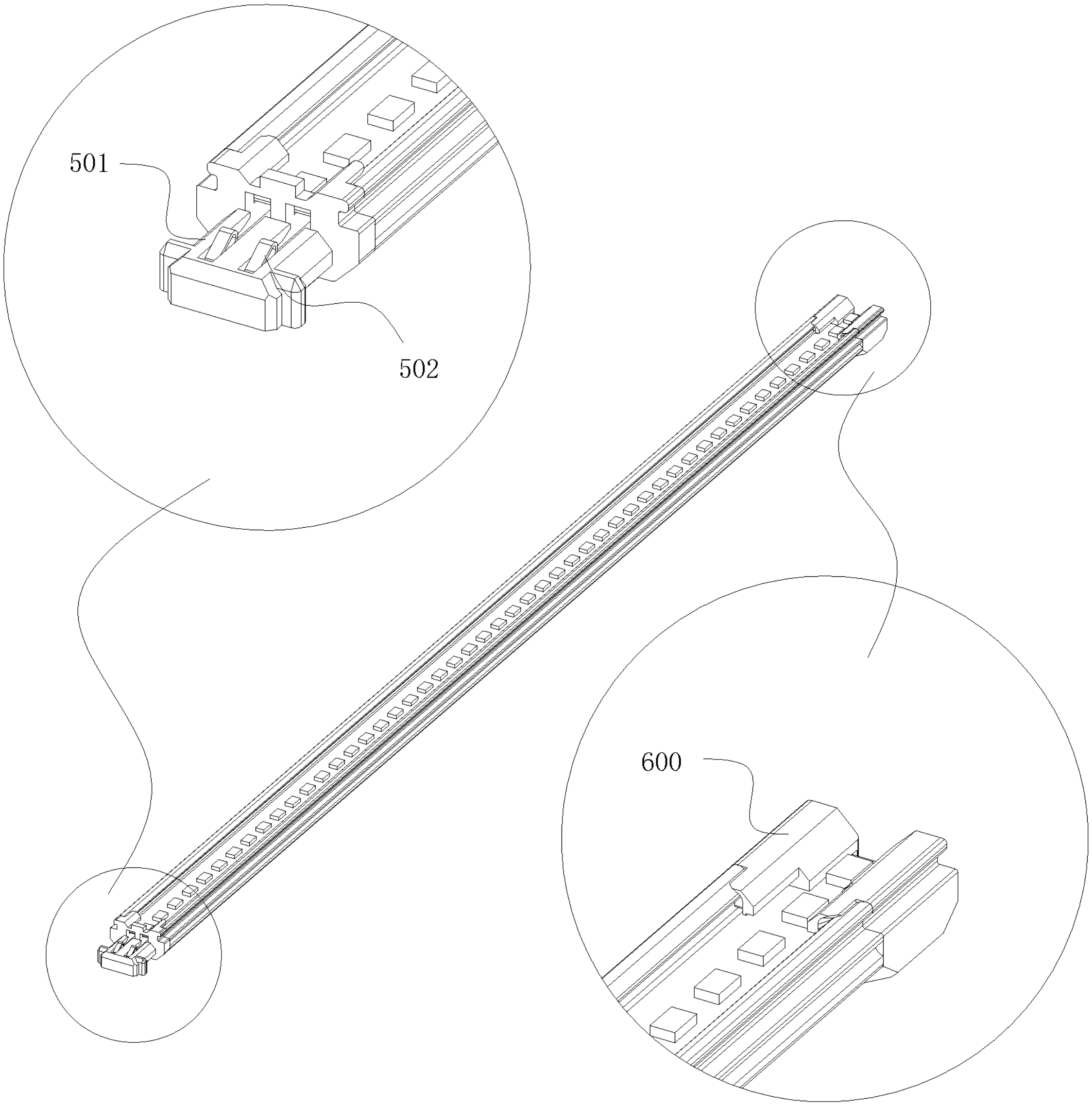
FIG. 4 is a structure schematic diagram of the interconnected strip lamp (with the lamp cover removed) of Embodiment 1.
Figure 5:
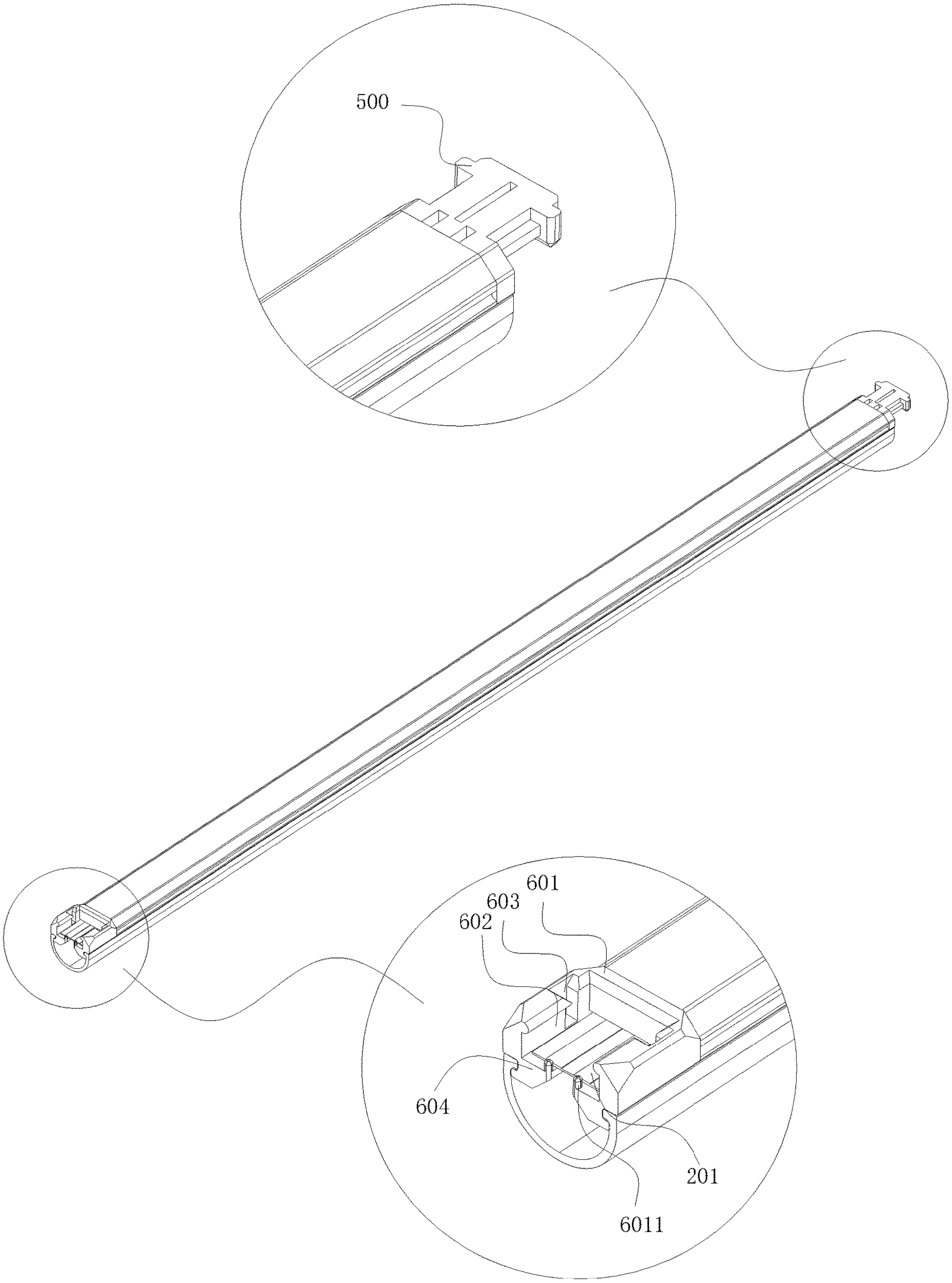
FIG. 5 is a structure schematic diagram of the interconnected strip lamp of Embodiment 1 at another angle.
Figure 6:
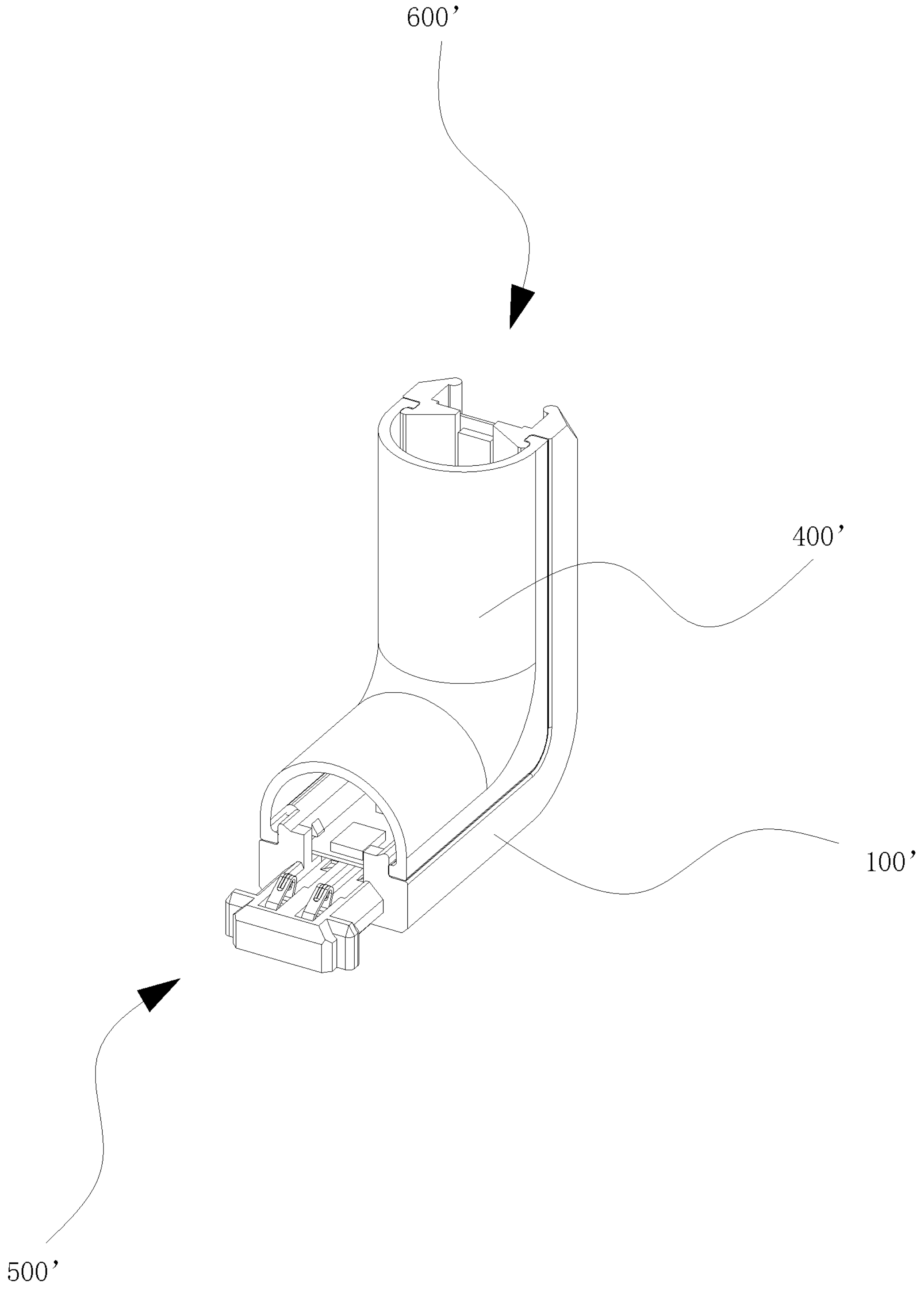
FIG. 6 is a structure schematic diagram of the interconnected strip lamp of Embodiment 2.
Figure 7:
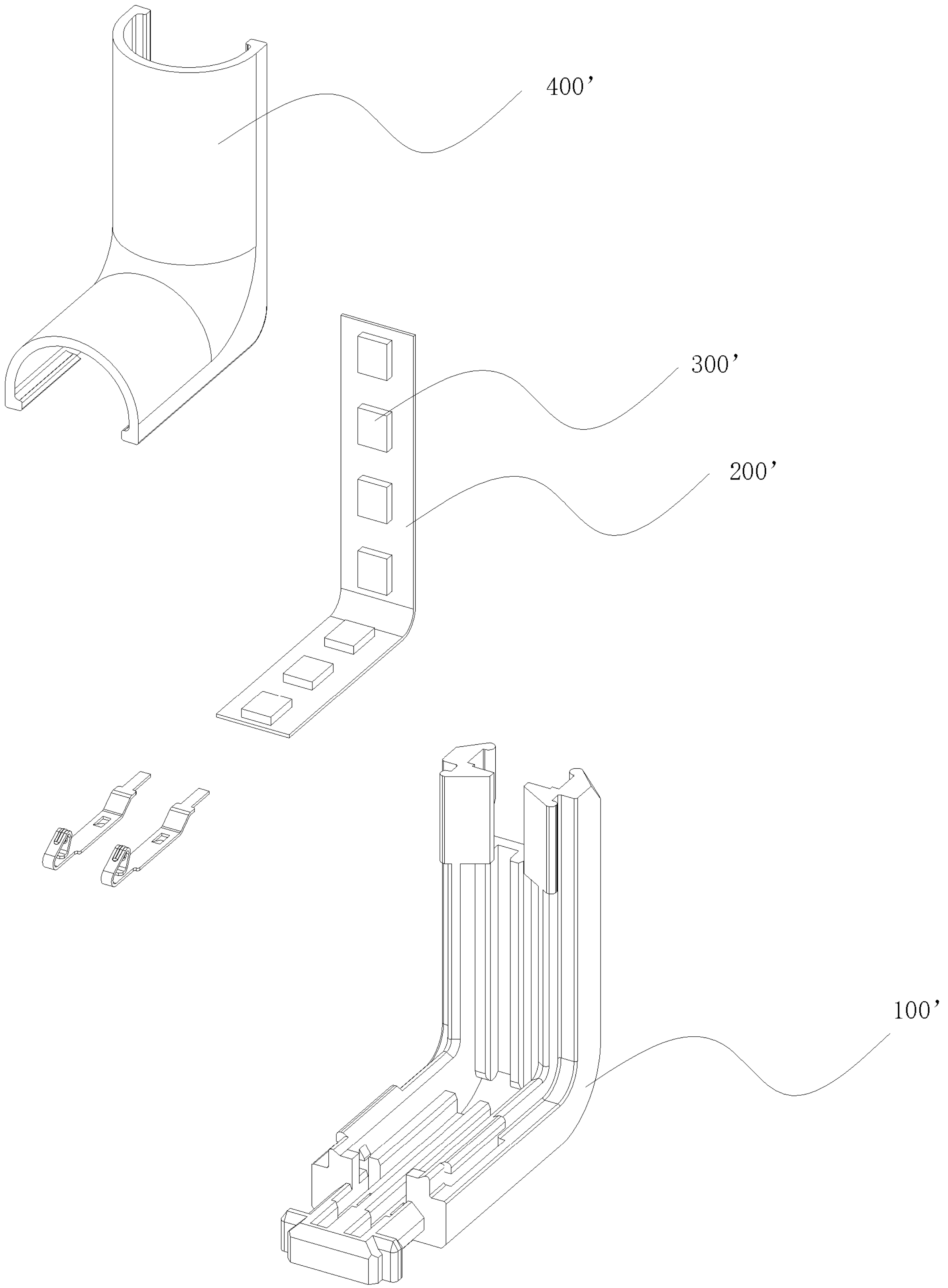
FIG. 7 is an exploded view of the interconnected strip lamp of Embodiment 2.
Figure 8:
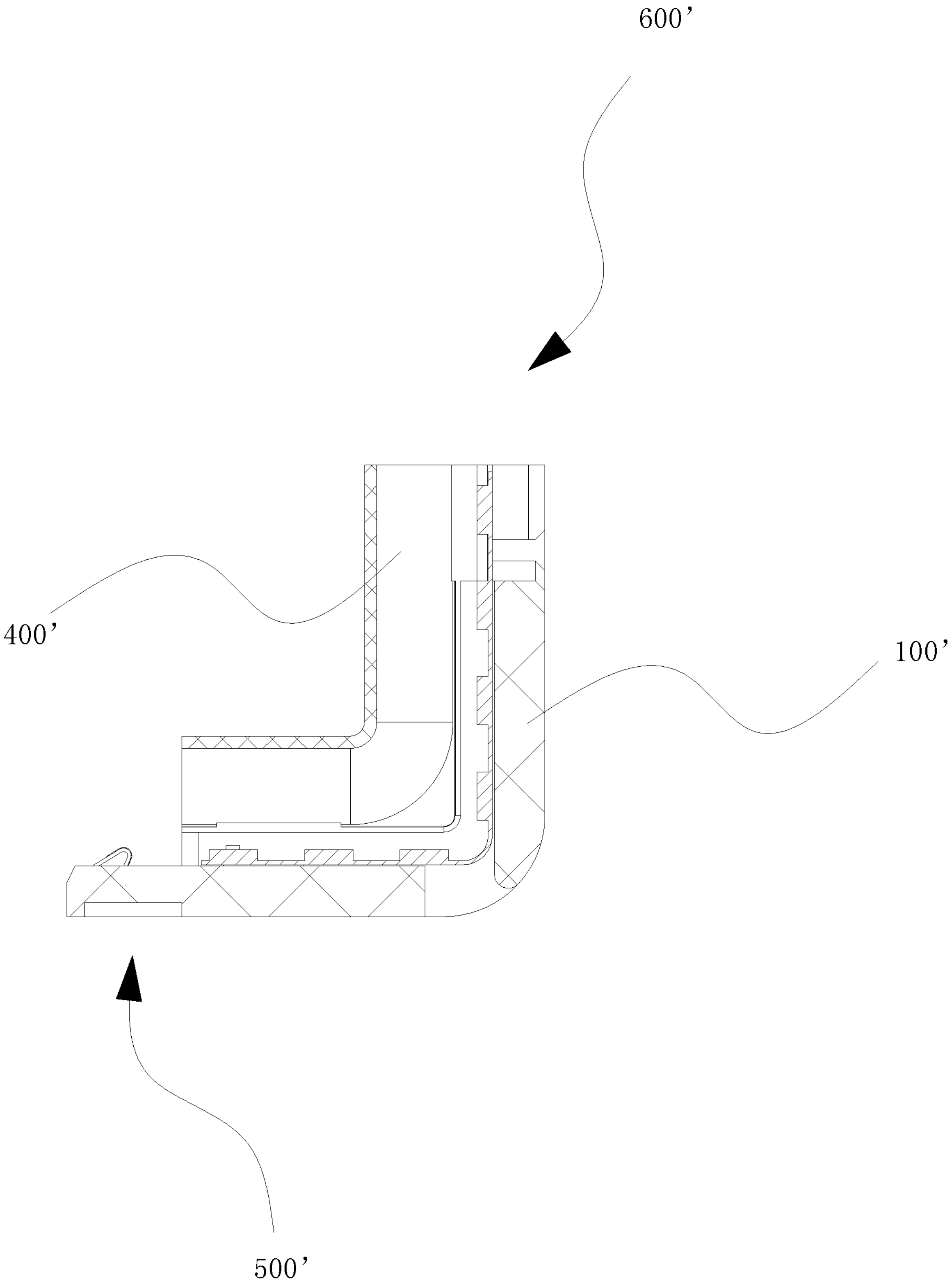
FIG. 8 is a structure schematic diagram of the cross-sectional structure of the interconnected strip lamp of Embodiment 2.
Figure 9:
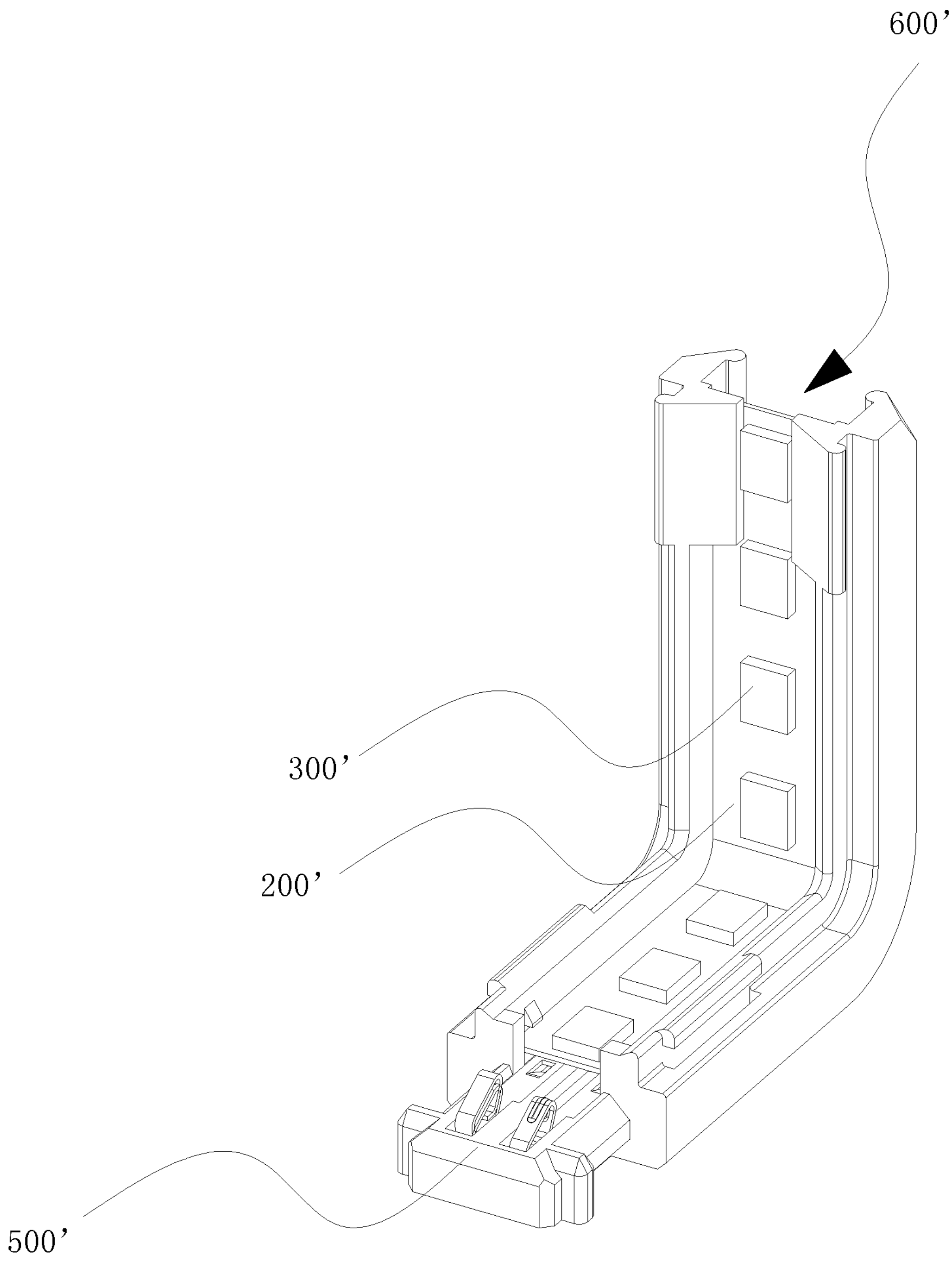
FIG. 9 is a structure schematic diagram of the interconnected strip lamp (with the lamp cover removed) of Embodiment 2.

Specific embodiments of the present invention will be described in further detail below based on the drawings. It should be understood that the description of the embodiments of the present invention herein is not intended to limit the protection scope of the present invention.

Embodiment 1

As shown in FIG. 1-5, the interconnected strip lamp of this embodiment, comprising a strip lamp holder 100, a strip circuit board 200 set on the strip lamp holder 100, a light source chip 300 set on the strip circuit board 200, an optical element 400 set above the light source chip 300, and, a male plug 500 and a female plug 600 set at each of the two ends of the strip lamp holder 100 respectively, wherein the strip circuit board 200 is made of a flexible board and is provided with a conductive layer 201 extending along the length direction on the back side.

For the interconnected strip lamp of the present invention, the direction of the optical element 400 with respect to the light source chip 300 is defined as frontward and the other opposite direction is defined as backward. Then the optical element 400 is provided on the front side of the strip lamp holder 100.

Because the strip circuit board 200 is made of a flexible board and is provided with a conductive layer 201 extending along the length direction on the back side, so it can be interconnected and conducted normally after any cutting, which makes the installation of the interconnected lamp more convenient, and also reduces the installation cost.

Interconnected strip lamp is a lamp that extends along its length direction. In this embodiment the strip lamp holder 100 is linear, and this specification is widely used.

In this embodiment, the male plug 500 comprises: a plug base 501 connected to the strip lamp holder 100, and the connection can be achieved by means of fastening through plug-in or fastener; and a conductive elastic member 502, fixed on the plug base 501, electrically connected at one end to the strip circuit board 200. The conductive elastic member 502 can be made in many ways, such as elastic needle, elastic sheet, etc. In this embodiment, the conductive elastic member 502 is form by bending conductive sheet, thus is simple in structure and easy to manufacture.

In this embodiment, the exposed surface of the conductive elastic member 502 is set on the same side as the light source chip 300. Due to above setting, when the lamps are interconnected, conductive elastic member 502 is inserted into the adjacent lamp and interconnected to the back side of the circuit board, thus can achieve the purpose of no dark area.

In this embodiment, the female plug 600 comprises a connecting base 601 and a connecting notch 602; connecting base 601 is connected to the strip lamp holder 100, and the connection can be achieved by means of fastening through plug-in or fastener. The strip circuit board 200 is extended and mounted to the connecting base 601; a connecting notch 602 is provided at the bottom of the connecting base 601, the back side of the strip circuit board 200 is oriented with the opening of the connecting notch 602. The connection notch 602 is also provided with a snap structure to prevent the plug base 501 from detaching.

When interconnecting, the male plug 500 and the female plug 600 of the two interconnected strip lamps are mated and connected, while the male plug 500 inserted through the connection notch 602 at the bottom of the connection base 601 and then interconnected by the conductive elastic member 502 and the conductive layer 201 against each other.

In this embodiment, the connection notch 602 is further provided with a limit slot 603 inside. The plug holder 501 is provided with a block 503, which matches with the limit slot 603 to realize the restriction in the length direction.

In this embodiment, front side of the connecting base 601 is provided with a necking 604 corresponding to the connecting notch 602 to block the side edges of the strip circuit board 200. The flexible circuit board can be effectively prevented from detaching from the lamp holder.

In this embodiment, the connecting base 601 is provided with a convex part 6011 for restricting end of the strip circuit board 200. Above structure allows the strip circuit board 200 to be restricted in length direction at the female plug 600.

The optical element 400 can be a component such as a lens for achieving light distribution, or a lamp cover for packaging. In this embodiment, the optical element 400 is a strip lamp cover.

Embodiment 2

As shown in FIG. 6-9, the interconnected strip lamp can be other variations than linear type. In this embodiment, the strip lamp holder 100' is L-shaped, and the strip circuit board 200' is set on the inner side of the strip lamp holder 100'.

In this embodiment, the plug base 501' and strip lamp 100' are integrally formed. And the connecting base 601' and the strip lamp 100' are integrally formed The rest structure in this embodiment is similar to Embodiment 1. The interconnected strip lamp of this embodiment further comprises a light source chip 300', an optical element 400', a male plug 500' and a female plug 600'. The strip circuit board 200' is made of a flexible board and is provided with a conductive layer 201' extending along the length direction on the back side.

Figure 10:
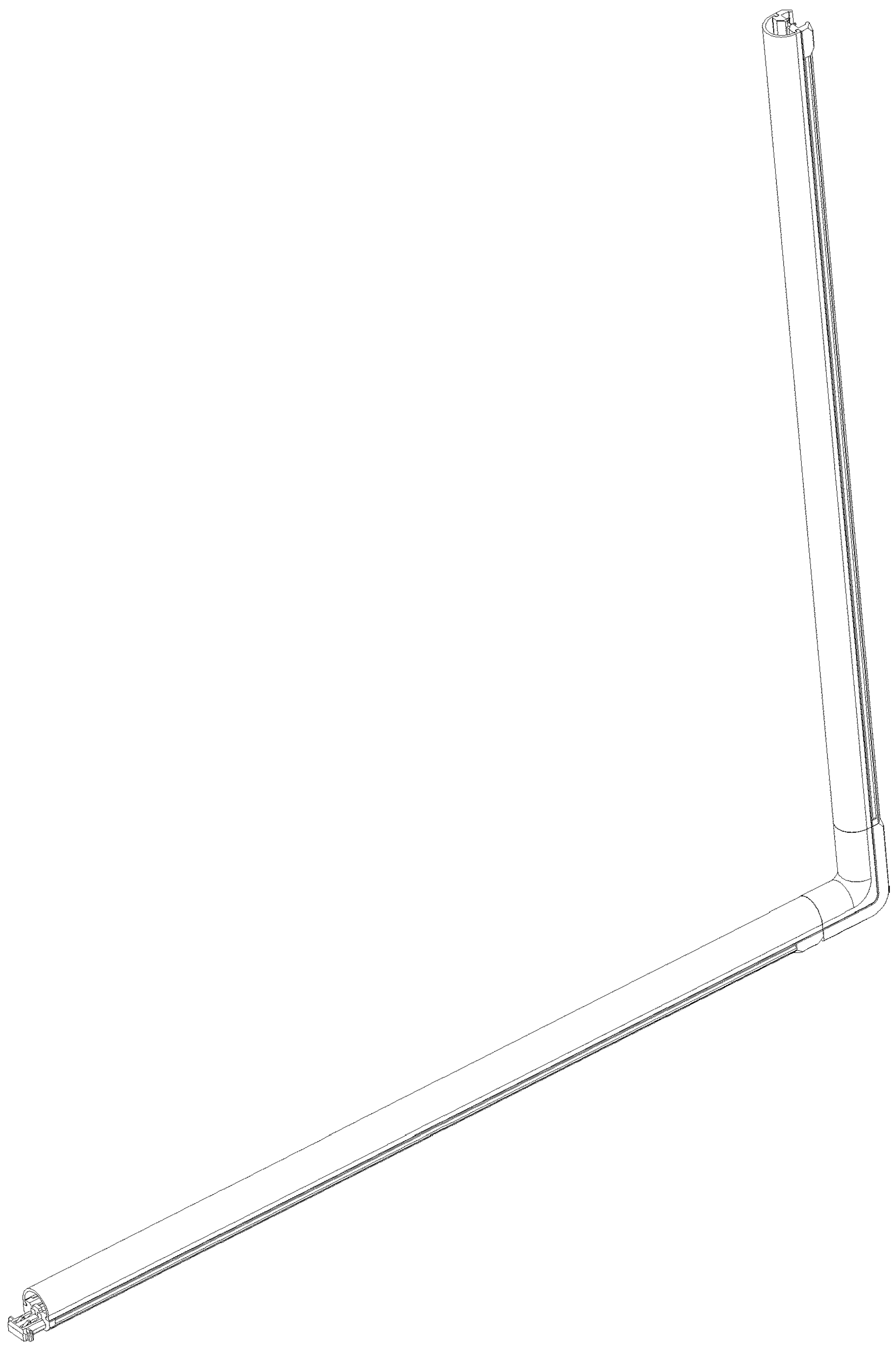
FIG. 10 is a structure schematic diagram of the interconnected strip lamps of Embodiment 1 and Embodiment 2 assembled together.
Figure 11:
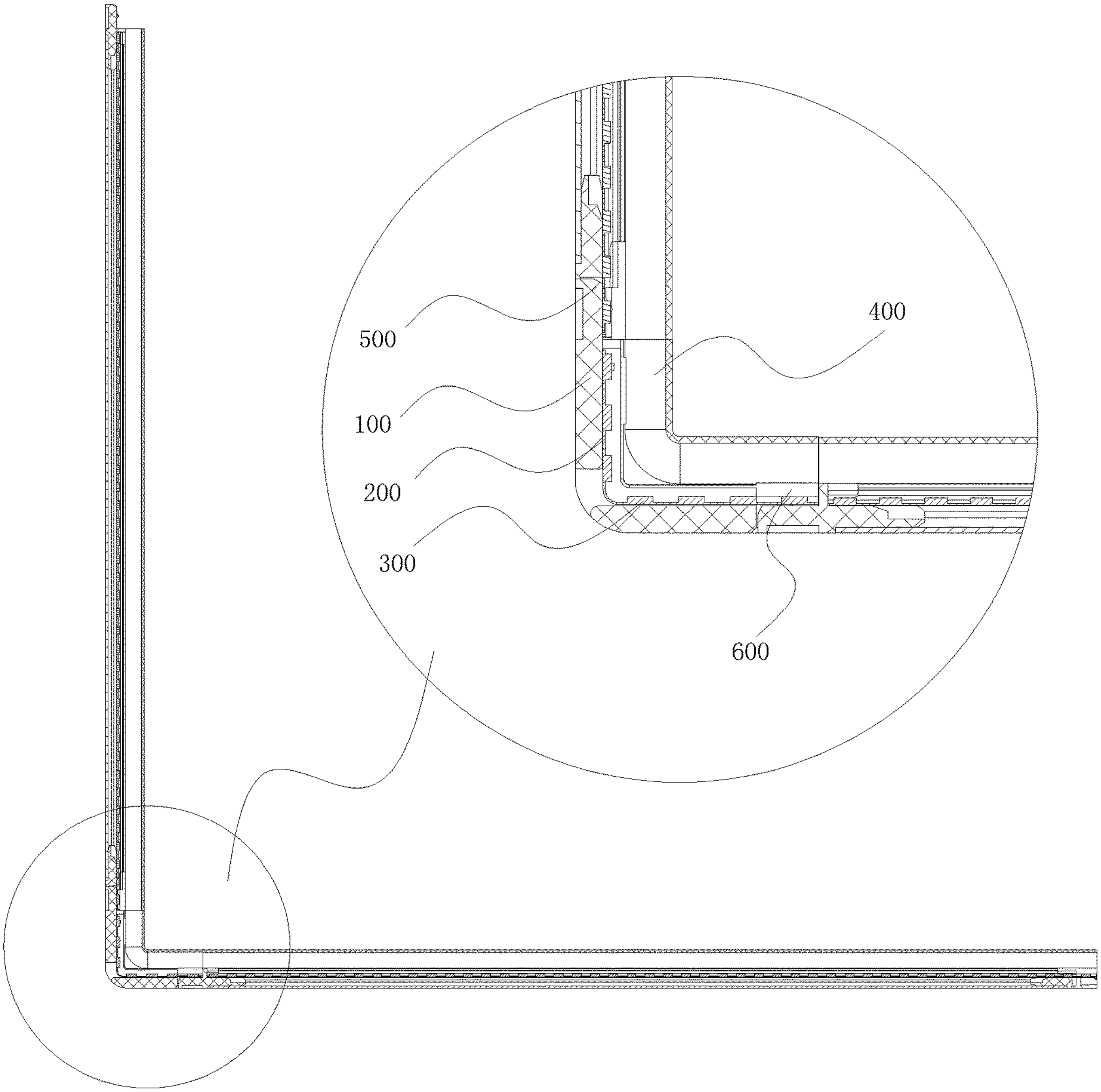
FIG. 11 is a cross-sectional view of FIG. 10.

The combined form of two interconnected strip lamps of Embodiment 1 and one of Embodiment 2 is shown in FIG. 10 and FIG. 11.

Embodiment 3

In this embodiment, the strip lamp holder 100" is L-shaped, and the strip circuit board 200" is set on the outer side of the strip lamp holder 100".

In this embodiment, the plug base 501" and strip lamp holder 100" are integrally formed. The connecting base 601 "and strip lamp holder 100" are integrally formed.

The rest structure in this embodiment is similar to Embodiment 1. The interconnected strip lamp of this embodiment further comprises a light source chip 300", an optical element 400", a male plug 500" and a female plug 600". The strip circuit board 200" is made of a flexible board and is provided with a conductive layer 201" extending along the length direction on the back side.

In addition to this, in another embodiment, the strip lamp holder 100 is Y-shaped. In another embodiment, the strip lamp holder 100 is cross-shaped. In another embodiment, the strip lamp holder 100 is V-shaped.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. An interconnected strip lamp, comprising a strip lamp holder (100), a strip circuit board (200) set on the strip lamp holder (100), a light source chip (300) set on the strip circuit board (200), an optical element (400) set above the light source chip (300), and, a male plug (500) and a female plug (600) set at both ends of the strip lamp holder (100), wherein the strip circuit board (200) is made of a flexible board and is provided with a conductive layer (201) extending along the length direction on the back side; the female plug (600) comprises a connecting base (601) connected to the strip lamp holder (100), the strip circuit board (200) is extended and mounted to the connecting base (601), the connecting base (601) is provided with a convex part (6011) for restricting end of the strip circuit board (200).

2. The interconnected strip lamp according to claim 1, wherein the male plug (500) comprises:

a plug base (501) connected to the strip lamp holder (100);

a conductive elastic member (502), fixed on the plug base (501), electrically connected at one end to the strip circuit board (200).

3. The interconnected strip lamp according to claim 2, wherein the exposed surface of the conductive elastic member (502) is set on the same side as the light source chip (300).

4. The interconnected strip lamp according to claim 2, wherein the plug base (501) and the strip lamp holder (100) are integrally formed.

5. The interconnected strip lamp according to claim 1, wherein the female plug (600) comprises:

a connecting notch (602), provided at the bottom of the connecting base (601), the back side of the strip circuit board (200) is oriented with the opening of the connecting notch (602).

6. The interconnected strip lamp according to claim 5, wherein the front side of the connecting base (601) is provided with a necking (604) corresponding to the connecting notch (602) to block the side edges of the strip circuit board (200).

7. The interconnected strip lamp according to claim 5, wherein the connecting base (601) and the strip lamp holder (100) are integrally formed.

8. The interconnected strip lamp according to claim 1, wherein the strip lamp holder (100) is linear, L-shaped, Y-shaped, cross-shaped or V-shaped.

9. The interconnecting strip lamp according to claim 1, wherein the optical element (400) is a strip lamp cover.

* * * * *